May 18, 1937.　　　　　　S. SMITH　　　　　　2,080,989

VEHICLE

Filed March 4, 1936　　　3 Sheets-Sheet 1

INVENTOR:
SYDNEY SMITH
By: Ruege + Boyce
ATTORNEYS

May 18, 1937.  S. SMITH  2,080,989
VEHICLE
Filed March 4, 1936  3 Sheets-Sheet 2
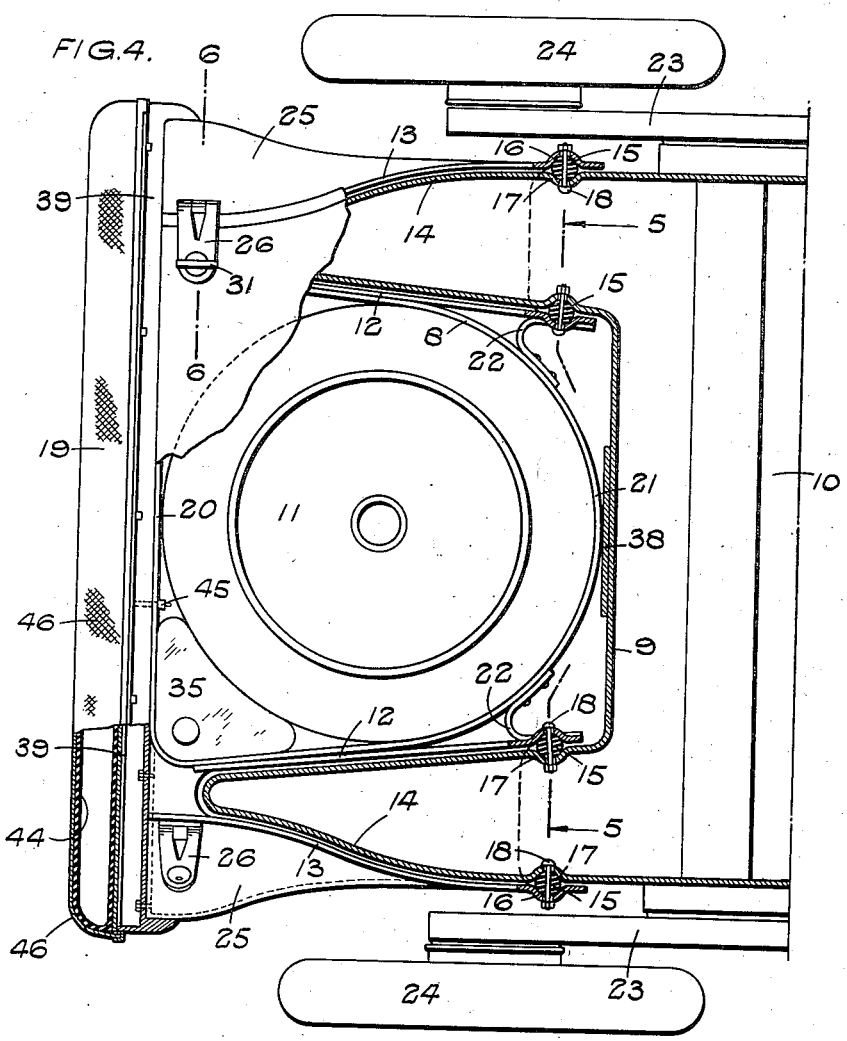
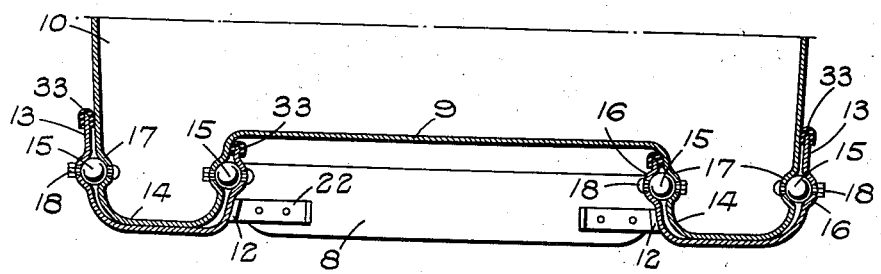
INVENTOR:
SYDNEY SMITH
BY: Ruger & Boyce
ATTORNEYS May 18, 1937.   S. SMITH   2,080,989
VEHICLE
Filed March 4, 1936   3 Sheets-Sheet 3
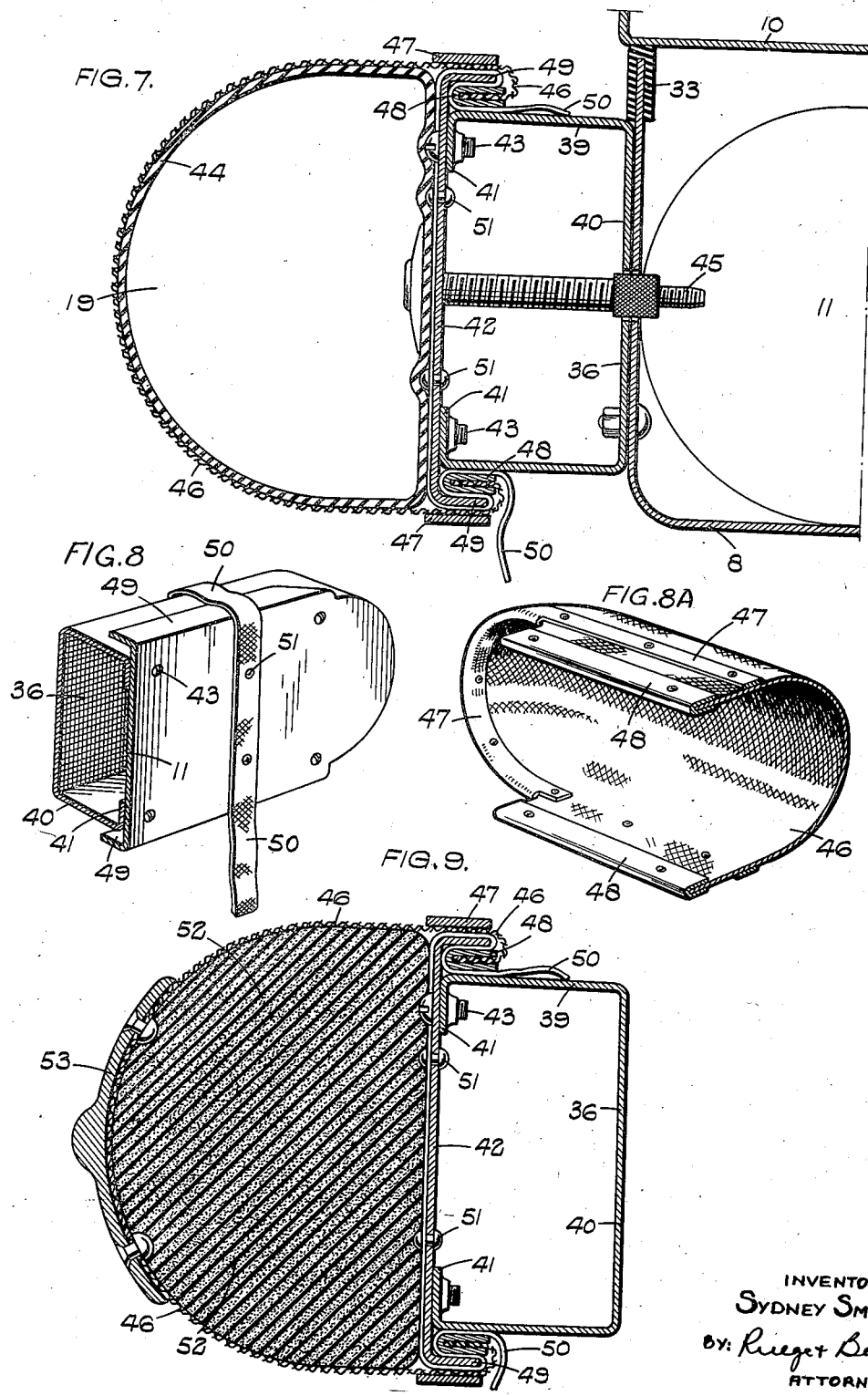
INVENTOR:
SYDNEY SMITH
BY: Rieger Boyce
ATTORNEYS Patented May 18, 1937

2,080,989

UNITED STATES PATENT OFFICE 2,080,989

VEHICLE

Sydney Smith, Chobham, England

Application March 4, 1936, Serial No. 67,034
In Great Britain December 21, 1934

15 Claims. (Cl. 293—55)

This invention relates to vehicles and particularly concerns automobile vehicles of the saloon type, the primary object being the provision of a carrier or housing for a spare wheel for the vehicle which may conveniently be combined with a bumper or collision guard.

A further object lies in the provision of an improved bumper or collision guard wherein the resilience of the tyre of a spare wheel can be utilized in the provision of, or can be added to, the resilience of the bumper or guard member proper.

Referring to the drawings:—

Figure 4 is a sectional plan view of same.

Figure 5 is a section on the line 5—5 of Figure 4.

Figure 7 is an enlarged section through the bumper.

Figure 8 is a perspective view of a part of the bumper.

Figure 8A is a perspective view of another part of said bumper.

Figure 9 is a section of part of a modified bumper.

Figure 1:
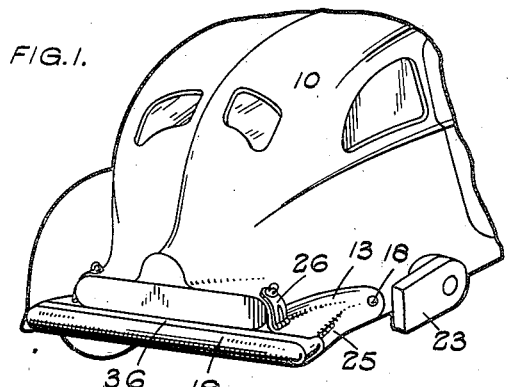
Figure 1 is a perspective view of the rear portion of a motor vehicle having applied thereto a wheel carrier according to this invention.

In the construction illustrated in the accompanying drawings, a shallow tray 8 is located in a recess 9 beneath the rear of the body 10 of an automobile vehicle, this tray being of sufficient size to receive a spare wheel 11 with the tyre fully inflated but in this latter condition the tyre preferably fits closely within the walls of the tray.

At each side the tray is provided with a pair of spaced connected arms 12 and 13 forming a fork between which is adapted to be located a portion 14 of the vehicle body extending longitudinally at the side of the recess 9 in which the tray is located.

At the projecting end of each arm 12 and 13 is a pivot connecting the tray movably to the vehicle body and each pivot comprises a ball 15 of rubber or other resilient material located between a cup-like recess 16 pressed from the arm 12 or 13 and a further cup-like recess 17 pressed in the side of the body portion 14 with a clamping bolt 18 extending through a hole in the ball 15 and through clearance holes in the cups 16 and 17.

Figure 2:
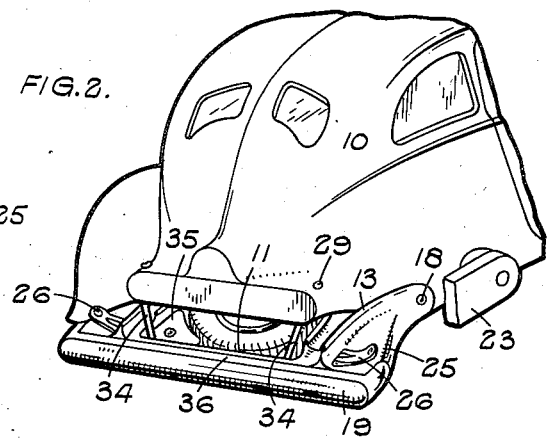
Figure 2 is a similar view showing the wheel carrier in the open position.
Figure 3:
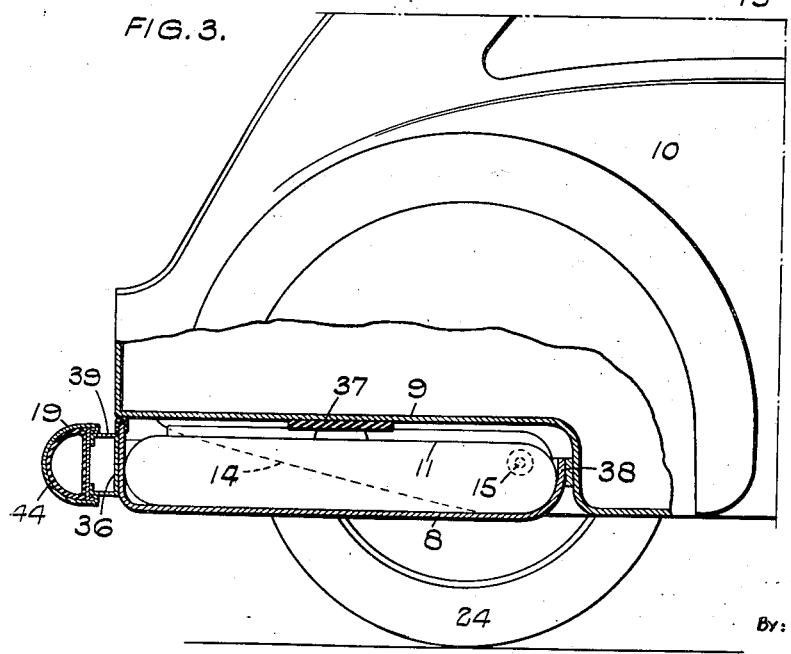
Figure 3 is a side elevation partly in section of the wheel carrier in the position shown in Figure 1.

The tray 8 is thus carried at each side on a pair of spaced pivots and can be moved from the closed position shown in Figure 1 in which the wheel is disposed closely adjacent the underside of the recess 9, to the open position shown in Figure 2 exposing the spare wheel.

When the carrier is in the closed position the outer end of the tray is located substantially flush with the rear end of the vehicle body and to the outer face of the tray is attached a pneumatic bumper or collision guard 19 mounted on a rigid base or foundation 36 secured to the rear outer face of the wheel carrier.

The tyre of the spare wheel engages between the inner face of the rear 20 of the tray and the inner face of the curved forward side 21 and thus forms a resilient buffer between these sides of the tray.

Figure 6:
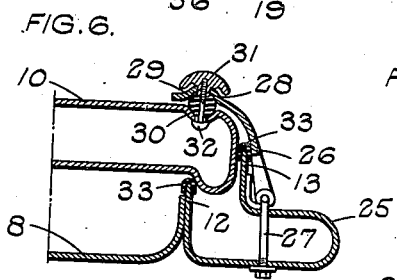
Figure 6 is a section on the line 6—6 of Figure 4.

Each inner arm 12 is connected at its forward end to the curved side 21 of the tray by means of a strengthening strip 22 and each outer arm 12 and 13 which extends forwardly into the space between the side of the body and the arm 23 carrying the road wheel 24, is shaped into hollow girder-like form as at 25 in Figure 6, this portion projecting beyond the width of the rear portion of the car to support the bumper at its extreme ends.

The tray is supported in the position shown in Figure 1 by means of a pair of straps 26 pivoted one at each side of the tray and adapted for detachable engagement with the body of the vehicle.

Each strap is bolted through the hollow portion 25 by means of a bolt 27 so that the load applied to the strap 26 is distributed and is not applied to a single thickness of metal.

Near the projecting end each strap is formed with a cup-like recess 28 adapted for engagement over the projecting portion of a ball 29 located in a further cup-like recess 30 pressed in the rear portion of the body. A wing nut 31 mounted in a hole in the cup 28 is adapted to engage over the screw-threaded end of a bolt 32 inserted through holes in the cup 30 and the ball 29.

The balls 29 are formed from rubber or other resilient material and when clamped in position as shown in Figure 6, the straps 26 connect the tray resiliently to the vehicle body and retain it in the normal position shown in Figures 1 and 6.

The upper edges of the arms 12 and 13 are covered with strips 33 of rubber or other suitable material, which prevent these edges damaging the painted surface of the vehicle body and at the same time provide weather protection.

Straps or other flexible members 34 connect the tray to the vehicle body near the rear thereof to limit movement of the tray to the open position and to prevent the tray dropping to the ground when the straps 26 have been released.

An auxiliary tank 35 is provided at one or each corner of the rear of the tray and an emergency supply of petrol can be carried in this manner.

A pad 37 of rubber or other resilient material is disposed between the hub of the spare wheel and the top of the recess 9 to protect the latter against local damage and to prevent the wheel moving within the tray and this pad may, if desired, be attached to the top of the recess 9.

The forward side 21 of the tray abuts a plate 38 at the forward side of the recess 9 so that the tray in its normal position is braced from the body.

The base 39 of the bumper comprises a trough-like metal pressing 40 with a flange 41 along each longitudinal edge of the open mouth thereof and a plate 42 secured across the open top of the trough by means of screws 43 inserted in screw-threaded holes in the flanges 41.

The pneumatic body 19 comprises a single length of inflatable rubber tubing 44 with closed ends and provided intermediate these ends with a valve 45 through which the body can be inflated to the desired extent.

When the tubing 44 is mounted upon the foundation the valve 45 extends through holes in the plate 42 and the base of the portion 40 to enable inflation of the body after assembly.

The tubing 44 is covered or enclosed by an outer covering 46 of canvas or similar material this covering being of elongated trough-like form with an open mouth of shape corresponding with the peripheral shape of the base or foundation.

Around the edge of the open mouth of the covering 46 is secured a bead or stiffener 47 preferably of metal and each longitudinal side edge of the cover is extended beyond this bead and provided with a further stiffening strip 48 of U section clipped over the edge of the covering and secured in position by pressure and/or by rivets.

Along each longitudinal edge of the plate 42 is a rearwardly extending flange 49 which extends parallel to the adjacent side of the portion 40 at sufficient spacing to accommodate the strip 48 as is shown in Figure 7.

The flanges extend continuously for the length of the foundation, but terminate short of the curved ends thereof as is shown in Figure 8 and at these curved ends the bead or stiffener 47 is bent to extend within the cover as is shown in Figure 8 to strengthen and stiffen the ends unsupported by the flanges 49.

A suitable number of tapes 50 are provided to facilitate disengagement of the strips 48 from the flanges 49, these tapes being riveted at 51 to the foundation and being inserted with the strip 48 into the space between the flange 49 and the adjacent side of the foundation.

To assemble the bumper the tubing 44 is mounted in position upon the base and the open mouth of the covering is passed over the tubing and over the flanges 49, the strips 48 being doubled back into the interior of the cover and being inserted with the tapes 50 behind the flanges 49.

The tubing 44 is then inflated to the desired pressure and the cover is retained in position by the strips 48 interlocking with the flanges 49.

To remove the cover it is only necessary to deflate the body and disengage the strips 48 by pulling the tapes 50 after which the cover can be distorted sufficiently to enable the strips 48 to clear the flanges 49.

In the modification shown in Figure 9, the tubing 44 is replaced by a resilient body 52 formed from material such as sponge rubber or hair coated with rubber, this body being enclosed in a covering 46 secured as described above. To attach the covering to the base or foundation the resilient body is compressed sufficiently to enable the fastening means on the cover to be engaged with the corresponding fastening means on the base or foundation.

A protective metal strip 53 is secured to the cover to prevent puncture of, or damage to, the resilient body due to a sharp localized blow and to distribute the effect over a large area. The strip may extend longitudinally along the bumper from end to end thereof and may be secured to the cover by rivets or the like.

The outer cover may be very thin and light, since it is not subjected to rubbing action or any considerable wear and its main purpose is to retain the resilient body in position and to provide some form of weather protection therefor.

The cover is preferably waterproofed with rubber, cellulose, paint or the like to prevent the canvas rotting and to increase the weather protection of the resilient body.

The strip 53 may be polished or chromium plated and may thus be advantageous from a decorative point of view, in addition to the advantage of protecting the bumper and distributing the effect of a local impact.

Alternatively protective plates may be secured to the interior or exterior of the cover in the form of overlapping yieldable scales.

The bumper according to my invention is extremely resilient without being heavy or expensive, is protected against deterioration on exposure to adverse weather conditions and can be of substantial size without unduly increasing the weight of the vehicle.

The tray when in the normal position as shown in Figure 1 is disposed beneath and closely adjacent the underside of the vehicle body and the appearance of the body is not impaired as is commonly the case when the spare wheel or a carrier therefor is disposed at the rear of the vehicle or in an exposed position on the exterior of the body.

The carrier and the spare wheel are mounted in such a position that the streamline effect of the body is not affected and since the carrier is resiliently mounted on balls of rubber or other resilient material, small vibrations such as might otherwise be communicated to the body are absorbed or damped out.

The effect of the rubber balls can be varied by adjusting the clamping bolts to vary the compression on the balls.

By mounting the tray at each side upon a pair of spaced balls engaging one at each side of the longitudinal member 14 the tray is firmly supported and the bumper 19 carried by the tray is supported positively from the longitudinal members.

Any blow or impact taken by the bumper is thus transmitted through the balls 15 which absorb or damp out the force of the impact and thus form a resilient addition to the bumper itself.

When the spare wheel is mounted within the tray with the tyre inflated, this latter forms a resilient buffer between the side walls of the tray and may be utilized to absorb some of the force of the impacts taken by the bumper. The tyre supports the rearward side 20 of the tray at substantially the centre of its length and thus applies strength to the centre of the bumper and forms a resilient buffer member between the forward and rearward sides of the tray.

If desired the forward side 21 of the tray may be stiffened by engagement with an abutment on the vehicle or its chassis and this abutment may comprise a transverse member secured across the underside of the vehicle or a longitudinal backbone strip or member provided on the body of the vehicle.

In the construction illustrated the tray is pivoted at each side to a longitudinal member 14 of the vehicle body but in a construction including a body mounted upon a separate chassis, the wheel carrier may be pivoted to the longitudinal members of the chassis.

What I claim is:—

1. In an automobile vehicle a spare wheel carrier, a spare wheel in said carrier, resilient pivot means for mounting said wheel carrier beneath the base of the vehicle, a resilient bumper carried by said wheel carrier, said bumper comprising an inner rubber body, and an enclosing cover therefor and means for retaining said wheel carrier in a position closely adjacent the base of the vehicle but permitting movement of said carrier to facilitate removal of a spare wheel and the arrangement being that the spare wheel operates as a resilient buffer between the bumper and the body and external blows are absorbed firstly by the resilient bumper and secondly by the spare wheel and the resilient pivot means for the wheel carrier.

2. An automobile vehicle including a body, a spare wheel carrier, means for mounting said wheel carrier pivotally beneath the base of said body, a resilient bumper carried by said wheel carrier, said bumper comprising a hollow inflatable rubber body and an enclosing cover therefor and means for retaining said wheel carrier in a position closely adjacent the base of said body but permitting movement of said carrier to facilitate removal of a spare wheel.

3. An automobile vehicle including a sheet metal body, a sheet metal base to said body, a spare wheel carrier, pivot means for mounting said wheel carrier directly on said sheet metal body and beneath the base thereof, said means including resilient rubber pivot members acting between said carrier and said body, a spare wheel in said carrier, a resilient bumper at one side of said carrier, abutment means at the other side of said carrier, the tyre of said spare wheel when inflated being adapted to form a resilient buffer between said bumper and said abutment means and means for retaining said wheel carrier in a position closely adjacent the base of said body but permitting movement of said carrier to facilitate removal of a spare wheel and the arrangement being that the spare wheel operates as a resilient buffer between the bumper and the body and external blows are absorbed firstly by the resilient bumper and secondly by the spare wheel and the resilient pivot means for the wheel carrier.

4. An automobile vehicle including a sheet metal body, sheet metal side walls to said body, a sheet metal base to said body, a spare wheel carrier comprising a shallow tray for housing a spare wheel, said carrier being adapted normally to be mounted adjacent said base, spaced arms at each of two sides of said tray, resilient pivot means connecting said arms to said sheet metal side walls, said means including resilient rubber members acting between said arms and said side walls, and means for retaining said wheel carrier in a position closely adjacent the base of the vehicle but permitting movement of said carrier to facilitate removal of a spare wheel.

5. An automobile vehicle including a body, a spare wheel carrier comprising a shallow tray for housing a spare wheel, resilient members at two sides of said tray connecting the latter pivotally beneath the base of said body and a resilient bumper on the rear side of said tray, said bumper comprising a resilient body and an outer covering for said resilient body and releasable fastening means for connecting said outer covering releasably to said wheel carrier.

6. An automobile vehicle including a sheet metal body, a sheet metal base to said body, said base having a recess in the underside thereof, a spare wheel carrier comprising a shallow tray for housing a spare wheel, resilient pivot means at two sides of said tray connecting the latter directly to the sheet metal body and in said recess, said pivot means including rubber balls located between seatings on the carrier and on the sheet metal body, and means for retaining said wheel carrier normally within said recess substantially flush with the base of said body but permitting movement of said carrier to facilitate removal of a spare wheel.

7. An automobile vehicle including a body, said body having a recess in the underside of the base thereof, a spare wheel carrier comprising a shallow tray for housing a spare wheel, resilient pivot means at two sides of said tray connecting the latter pivotally in said recess, said pivot means including rubber balls located between seatings on the carrier and on the body, a resilient bumper on the rear side of said tray, said bumper comprising an inner rubber body, and an enclosing cover therefor and means for retaining said wheel carrier normally within said recess substantially flush with the base of said body but permitting movement of said carrier to facilitate removal of a spare wheel.

8. An automobile vehicle including a sheet metal body, sheet metal side walls to said body, a sheet metal base to said body, a spare wheel carrier comprising a shallow tray for housing a spare wheel, said base having a recess in the underside thereof, pivot means at two sides of said tray connecting the latter directly to said sheet metal side walls and in said recess, said pivot means including rubber balls located between seatings on the carrier and on said sheet metal walls, and means for retaining said wheel carrier in a position closely adjacent the base of said body but permitting movement of said carrier to facilitate removal of a spare wheel.

9. An automobile vehicle including a sheet metal body, sheet metal side walls to said body, a sheet metal base to said body, a spare wheel carrier comprising a shallow tray for housing a spare wheel, said base having a recess in the underside thereof, pivot means at two sides of said tray connecting the latter directly to said sheet metal side walls and in said recess, said pivot means including rubber balls located between seatings on the carrier and on said sheet metal walls, straps for retaining said wheel carrier in a position closely adjacent the base of said body and releasable connections for said straps permitting movement of said carrier to facilitate removal of a spare wheel.

10. An automobile vehicle including a body, a spare wheel carrier comprising a shallow tray for housing a spare wheel, resilient pivot means at two sides of said tray connecting the latter pivotally beneath the base of said body, straps on said wheel carrier for retaining the latter in a position closely adjacent the base of said body and means for connecting said straps resiliently to said body, said means being readily releasable permitting movement of said carrier to facilitate removal of a spare wheel.

11. In an automobile vehicle the combination of a sheet metal body, sheet metal side walls to said body, a sheet metal base to said body, said base having a recess in the underside thereof, a spare wheel carrier mounted directly on said sheet metal body and in said recess, a spare wheel in said carrier, a resilient bumper extending across said body, arms extending from said bumper longitudinally of said body, resilient pivot means for connecting said arms resiliently to said sheet metal body, the arrangement being that the spare wheel operates as a resilient buffer between the bumper and the body and external blows are absorbed firstly by the resilience of the bumper and said pivot means and secondly by the spare wheel.

12. In an automobile vehicle the combination of a sheet metal body, sheet metal side walls to said body, a sheet metal base to said body, said base having a recess in the underside thereof, a spare wheel carrier mounted directly on said sheet metal body and in said recess, a spare wheel in said carrier, a resilient bumper extending across said body, arms extending from said bumper longitudinally of said body, resilient rubber members for connecting said arms resiliently to said sheet metal body, said means including resilient rubber balls mounted between seatings in said arms and seatings in said sheet metal body, the arrangement being that the spare wheel operates as a resilient buffer between the bumper and the body and external blows are absorbed firstly by the resiliency of the bumper and said pivot means and secondly by the spare wheel.

13. An automobile vehicle including a sheet metal body, sheet metal side walls to said body, a resilient bumper extending transversely of said body, arms extending from said bumper longitudinally of said body, and means for connecting said arms directly to the sheet metal side walls of said body, said means including balls of resilient material adapted to damp out vibrations passing between said arms and said sheet metal body.

14. An automobile vehicle including a sheet metal body, a sheet metal base to said body, sheet metal side walls to said body, a resilient bumper extending transversely of said body, arms extending from said bumper longitudinally of said body, a shallow tray carried between said arms and forming a spare wheel carrier, said tray being adapted to be disposed normally adjacent the underside of said base, and pivot means for connecting said arms directly to the sheet metal side walls of said body to permit movement of said tray to expose the spare wheel, said means including balls of resilient material adapted to damp out vibrations passing between said arms and said sheet metal body.

15. In an automobile vehicle a sheet metal body, a sheet metal base to said body, a spare wheel carrier, a spare wheel in said carrier, means for mounting said wheel carrier pivotally on said sheet metal body, said means including balls of resilient material, said carrier being adapted to be located normally in a position closely adjacent the sheet metal base but being movable to facilitate removal of a spare wheel and a resilient bumper extending across said carrier, the arrangement being that the spare wheel operates as a resilient buffer between the bumper and the vehicle.

SYDNEY SMITH.